Figure 1:
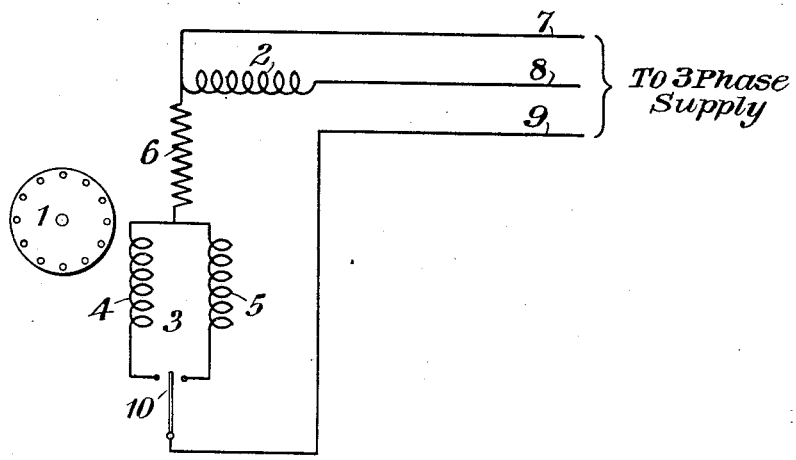

July 28, 1925.

H. L. TANNER

SERVO-MOTOR

Filed June 28, 1921

1,547,844

Harry L. Tanner INVENTOR
BY Moakley and Gill
ATTORNEYS.

Patented July 28, 1925.

UNITED STATES PATENT OFFICE.

HARRY L. TANNER, OF BROOKLYN, NEW YORK.

SERVO-MOTOR.

Application filed June 28, 1921. Serial No. 480,951.

*To all whom it may concern:*

Be it known that I, HARRY L. TANNER, residing at Brooklyn, in the county of Kings, State of New York, have invented certain new and useful Improvements in Servo-Motors; and I do hereby declare the following to be a full, clear, and exact description of the invention, such as will enable others skilled in the art to which it appertains to make and use the same.

This invention relates to servo-motors particularly adapted for use in connection with instruments having moving parts which require frequent reversal, such, for instance, as the power driven elements of gyroscopic compasses.

It is well known that a two-phase induction motor may be made to operate satisfactorily as a reversing motor by having one of its phases double wound, the two windings being so connected that the direction of rotation of the motor will depend upon which one is used. If the instrument with which the servo-motor is to be used is operated by current of more than two phases it is desirable to operate the motor by the same kind of current. If, for instance, three-phase current be used, and a motor such as mentioned above be connected to the three-phase circuit the currents in the two windings will be displaced by 60° or 120°, and its output will be lessened, because there should be a phase angle of 90° between the currents to obtain maximum output from the motor.

It is an object of this invention to provide an induction motor which may be operated from a polyphase circuit the phases of which are not 90° apart and which may be reversed by means of a single set of reversing contacts, thereby eliminating the use of relays or more complicated contact devices required for reversing polyphase motors of the usual type.

In accordance with the invention a two-phase motor having one of its phases double and reversely wound is arranged so that it may be operated to best advantage by polyphase current having a phase relation of other than 90° by producing in one of the phases of the motor a current which differs from the current in the other phase by substantially 90°. The phase relation of the currents in the two phases may be produced by using in connection with one of them, preferably the one that is double wound, a resistance of proper magnitude to produce such voltage current relations in the two phases as will cause the currents therein to differ approximately 90° from each other.

A motor is thus produced from which the maximum output may be obtained and the direction of rotation of which may be changed by connecting in circuit one or the other of the windings of the double wound phase by contact mechanism actuated by the instrument with which the motor is associated.

For the purpose of illustration an embodiment of the invention adapted for use in connection with a three-phase circuit will be shown and described. In such a motor the resistance used in connection with one of the phases will have such a value that the current in this phase will lag behind the electro-motive-force producing it by an angle which is approximately 30° less than the amount by which the current in the other phase lags behind its electro-motive-force. By connecting the phase having the resistance associated therewith to the phase of the supply circuit whose electro-motive-force lags 120° behind that of the phase to which the other phase of the motor is connected, the currents in the two phases of the motor will be displaced approximately 90° from each other, and the motor will operate to best advantage.

Figure 2:
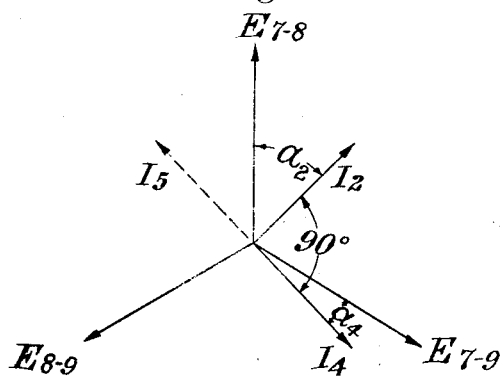

In the accompanying drawings,

Fig. 1 is a diagrammatic representation of the windings and rotor of the motor, and Fig. 2 is a vector diagram of the electro-motive-forces and currents in the windings.

The motor comprises a rotor of suitable construction, indicated diagrammatically at 1 in Fig. 1, and a two-phase stator consisting of a suitable core upon which are placed windings 2 and 3, the latter being composed of two parts 4 and 5 reversely wound to produce fluxes of opposite polarity. Connected to the inner ends of the windings 4 and 5 is a resistance 6 the other terminal of which is connected to the inner end of winding 2 as well as to one of the conductors 7 of a three-phase line, the second conductor 8 of which is connected to the outer end of winding 2, while the third conductor 9 is connected to a contact device 10 by which either of the windings 4 or 5 may be connected to a phase of the line. It will be understood that the contact device may be operated by suitable mechanism forming a part of the instrument with which the motor is associated, but which, since it forms no part of this invention, is not shown on the drawing.

The operation of the motor will appear most clearly when considered in connection with the vector diagram of Fig. 2 in which $E_{7-8}$ represents the electro-motive-force between conductors 7 and 8 and $I_2$ the corresponding current in coil 2, which differs in phase from the electro-motive-force producing it by an angle $\alpha_2$.

Assuming that the contact device 10 is so disposed as to connect winding 4 in circuit, then $E_{7-9}$ represents the electro-motive-force applied to this winding, which is 120° from $E_{7-8}$, and $I_4$ represents the current in this winding. $E_{8-9}$ represents the electro-motive-force between conductors 8 and 9 and is 120° from both $E_{7-8}$ and $E_{7-9}$.

In a similar manner, $I_5$ represents the current in winding 5 when it is substituted for winding 4, and since these windings are reversed with respect to each other, $I_5$ is shown equal and opposite to $I_4$, indicating that the flux produced by winding 5 is of opposite polarity to that produced by winding 4.

The magnitude of resistance 6 is such that when combined with either winding 4 or winding 5 the current $I_4$ or $I_5$ therein will lag behind the electro-motive-force $E_{7-9}$ which produces it by an angle $\alpha_4$ which is approximately 30° less than $\alpha_2$. There will thus be a phase difference of substantially 90° between $I_2$ and $I_4$, or $I_5$ in case the latter winding is employed. The currents in the windings will thus differ from each other by the angle which is required for obtaining maximum output from a two-phase motor, but the motor may be reversed without the use of relays or other more complicated arrangements which have heretofore been employed. The elimination of such mechanisms in conjunction with the simple structure of the motor renders it particularly adapted for use as a servo-motor in connection with instruments having moving parts which are subject to frequent reversals, but which do not require any considerable power for their actuation.

While an embodiment of the invention adapted for use with a particular polyphase circuit has been shown and described it will be understood that by suitable changes in the resistance used in connection with one of the phases of the motor it may be operated equally well by polyphase currents of any other number of phases. Various other changes may also be made in the details of the apparatus without departing from the principle of the invention as defined in the appended claim.

I claim:

In a servo-motor, three conductors leading to a source of three-phase current supply, a rotor, a two-phase stator having the winding for one of its phases connected between a pair of the conductors, a pair of reversely wound coils constituting the winding for the other phase of the stator, means for connecting one or the other of said coils to the third conductor to determine the direction of rotation of the rotor and a resistance common to said coils and connected to one of the conductors of said pair of conductors beyond said first named winding for producing a phase difference of substantially 90° between the currents in the first named winding and that one of the coils of the other winding which is effective at the time.

In testimony whereof I affix my signature.

HARRY L. TANNER.